US012036166B1

(12) United States Patent
Sverdlik et al.

(10) Patent No.: US 12,036,166 B1
(45) Date of Patent: Jul. 16, 2024

(54) PATIENT TRANSFER-TREATMENT CENTERS (PTTCs) AS A LINE OF SAFE PATIENT HANDLING (SPH) DEVICES FOR MULTI-SERVICE BEDRIDDEN AND LOW-MOBILITY PATIENTS BY A SINGLE CAREGIVER

(71) Applicants: David Sverdlik, Buffalo Grove, IL (US); Alla Sverdlik, Northbrook, IL (US); Bella Dishell, Northbrook, IL (US)

(72) Inventors: David Sverdlik, Buffalo Grove, IL (US); Alla Sverdlik, Northbrook, IL (US); Bella Dishell, Northbrook, IL (US)

( * ) Notice: Subject to any disclaimer, the term of this patent is extended or adjusted under 35 U.S.C. 154(b) by 0 days.

(21) Appl. No.: 18/472,878

(22) Filed: Sep. 22, 2023

(51) Int. Cl.
*A61G 7/10* (2006.01)

(52) U.S. Cl.
CPC ......... *A61G 7/1019* (2013.01); *A61G 7/1001* (2013.01); *A61G 7/1034* (2013.01); *A61G 7/1046* (2013.01); *A61G 7/1057* (2013.01)

(58) Field of Classification Search
None
See application file for complete search history.

(56) References Cited

U.S. PATENT DOCUMENTS

| | | | | |
|---|---|---|---|---|
| 2,710,975 | A | 6/1955 | Stoen | |
| 3,373,453 | A | 3/1968 | Goodman | |
| 5,255,934 | A | 10/1993 | Wilson | |
| 5,526,537 | A | 6/1996 | Conrad | |
| 5,704,439 | A | 1/1998 | Kitahama et al. | |
| 5,725,275 | A | 3/1998 | Wigfall | |
| 6,154,899 | A | 12/2000 | Brooke et al. | |
| 6,176,508 | B1 | 1/2001 | Malassigne et al. | |
| 6,185,769 | B1 | 2/2001 | Larisey, Jr. et al. | |
| 6,357,063 | B1 * | 3/2002 | Selby | A61G 1/0231 5/81.1 R |
| 6,418,571 | B1 | 7/2002 | Cheng | |
| 6,547,265 | B1 | 4/2003 | Enge et al. | |
| 7,520,518 | B2 | 4/2009 | Peterson et al. | |
| 9,393,167 | B2 | 7/2016 | Ganel | |
| 9,592,169 | B2 | 3/2017 | Eddy et al. | |
| 9,820,901 | B2 | 11/2017 | Brown et al. | |
| 10,292,880 | B2 | 5/2019 | Chang | |

(Continued)

FOREIGN PATENT DOCUMENTS

| | | | |
|---|---|---|---|
| JP | H1014993 | A | 1/1998 |
| JP | 2006314600 | A | 11/2006 |

(Continued)

*Primary Examiner* — Justin C Mikowski
*Assistant Examiner* — Adam C Ortiz
(74) *Attorney, Agent, or Firm* — Brian Roffe

(57) ABSTRACT

Two-seat mechanized patient transfer-treatment system that enables a single caregiver to move and deliver multi-services directly to bedridden and low-mobility patients at any time and distance from the support surface without removing the patient from the support seat. The system provides a chain of temporarily built service assemblies, of a top unit to which two seats can be removably connected and one of a quantity of different mobile or stationary bases, adapted for modification to serve a sequence of multifunctional indoor-outdoor operations, and wherein a single caregiver can make changes at any time during the service.

17 Claims, 3 Drawing Sheets

(56) References Cited

U.S. PATENT DOCUMENTS

| | | | | |
|---|---|---|---|---|
| 10,980,691 | B1 * | 4/2021 | Sverdlik | A61G 9/003 |
| 2002/0020987 | A1 * | 2/2002 | Coleman | A61G 5/1002 280/288.4 |
| 2004/0093673 | A1 | 5/2004 | Marshall | |
| 2005/0104319 | A1 | 5/2005 | Wing | |
| 2006/0048296 | A1 | 3/2006 | Sutou et al. | |
| 2007/0124859 | A1 | 6/2007 | Stryker et al. | |
| 2010/0154115 | A1 | 6/2010 | Wernqvist et al. | |
| 2012/0292883 | A1 * | 11/2012 | Noonan | A61G 5/125 280/304.1 |
| 2014/0208493 | A1 | 7/2014 | Munir | |
| 2015/0272797 | A1 | 10/2015 | Hines | |
| 2015/0342822 | A1 | 12/2015 | Osterhaus | |
| 2017/0056267 | A1 | 3/2017 | Stryker et al. | |
| 2017/0252259 | A1 | 9/2017 | Evans et al. | |
| 2019/0038497 | A1 | 2/2019 | Bonis | |
| 2019/0350411 | A1 | 11/2019 | Hart et al. | |
| 2022/0151850 | A1 * | 5/2022 | Tiu | A61G 7/1017 |

FOREIGN PATENT DOCUMENTS

| | | | |
|---|---|---|---|
| JP | 2010172686 | A | 8/2010 |
| JP | 3194973 | U | 12/2014 |

* cited by examiner

PATIENT TRANSFER-TREATMENT CENTERS (PTTCs) AS A LINE OF SAFE PATIENT HANDLING (SPH) DEVICES FOR MULTI-SERVICE BEDRIDDEN AND LOW-MOBILITY PATIENTS BY A SINGLE CAREGIVER

FIELD OF INVENTION

The present relates to a system enabling a single caregiver to provide multiple services to a bedridden patient by a single caregiver. The present invention also relates to development lines of multi-service bedridden patients by a single caregiver.

BACKGROUND OF INVENTION

Most existing devices for safe patient handling (SPH) are designed for servicing patients with at least minimum ability of patient cooperation with a single caregiver. The specifics of serving bedridden patients are the patient's inability to assist in transportation away from the bed or support surface, with required multi-service at any time and distance from the support surfaces and where the described but not limited service of the bedridden patient by a single caregiver must be safe and effortlessly performed by the single caregiver.

Wilson (U.S. Pat. No. 5,255,934) describes a two-seat design to use a toilet without removing the patient from the supporting seat. The Wilson design is complicated, customized, expensive, and hard to use.

The Sverdlik et al. patent (U.S. Ser. No. 10/980,691) describes a two-seat design of support and change seat under a patient in a suspended position. Still, the Sverdlik et al. patent is short in developing the concepts and practical solutions enabling complex multi-service and mobility for bedridden patients by a single caregiver without repositioning or contacting the patient for multi-service.

SUMMARY OF THE INVENTION

A system in accordance with the invention, referred to as the development of a patient transfer-treatment center (PTTC), is a system for multi-service bedridden patients by a single caregiver and a tool to modernize the structure of the home and institutional service for bedridden patients.

The invention PTTC embodies the concept and design of mechanized operations of patient transfer and treatment as a line of customized assemblies that enable performing multiple and complex transfers, treatments, and mobility services to bedridden patients by a single caregiver at any time of the service.

The PTTC is a mechanized system of vertical movements and engagement seats supporting the patient, wherein the single caregiver enables the transfer of the patient from the bed on which the patient is situated to any destination and provides services directly to the patient in a suspended position by a replaceable service seat, at any time of the service, and wherein the bedridden patient in the PTTC mechanized seat engagement operation is considered as a sensitive passive load supported by a seat without contact or repositioning by the single caregiver.

PTTC's line of products is designed as an embodiment of the concepts of engagement seats supporting patients in a suspended position described in the Sverdlik et al. U.S. Pat. No. 10,980,691B1, and provides new ideas of design enabling multi-SPH service for a bedridden patient by a single caregiver.

BRIEF DESCRIPTION OF THE DRAWINGS

The following drawings are illustrative of embodiments of the system developed or adapted using the teachings of at least one of the embodiments disclosed herein and are not meant to limit the scope of the disclosure as encompassed by the claims.

DETAILED DESCRIPTION OF THE INVENTION

The present invention is defined by the claims and illustrated by the accompanying drawings in the utility application, and nothing in this section should be taken as a limitation on those claims.

The overview of the invention is shown in FIGS. 1-6.

Figure 1:
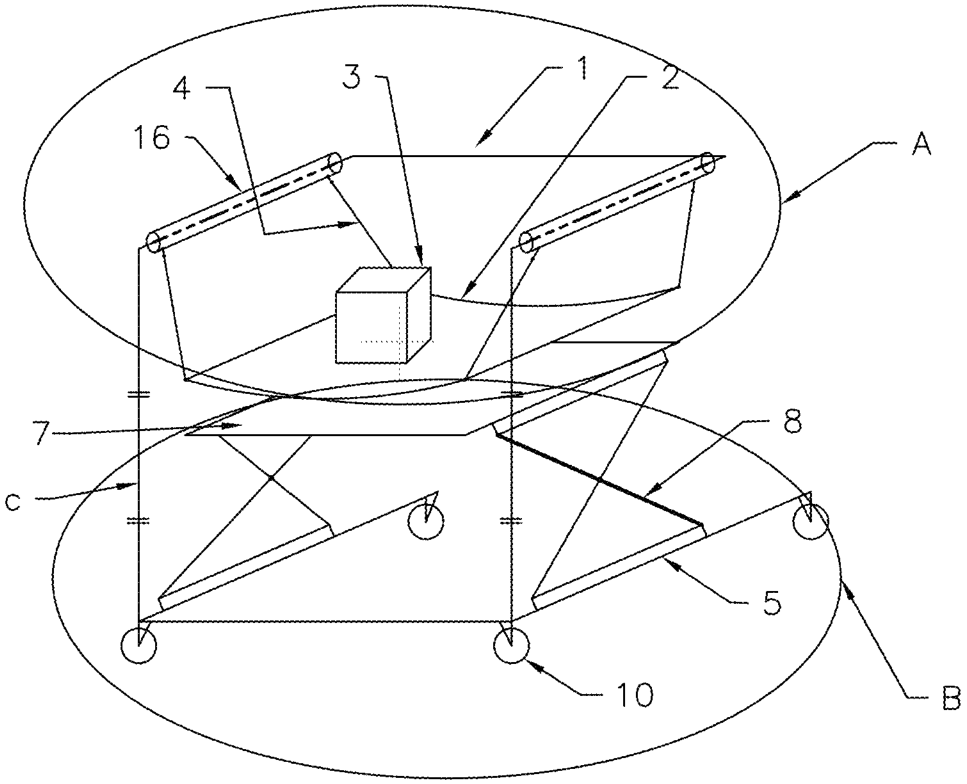
FIG. 1 is an illustration of one embodiment of a PTTC in accordance with the invention with a mobile base.

PTTC's are a line of mechanized mobile systems enabling transportation and multi-services of bedridden patients by a single caregiver any time at the service and presented as follows:

PTTC is a line of mechanized systems of transfer and multi-services bedridden patients by a single caregiver comprising customized assemblies of top unit A and bottom unit B connected by removable connecting elements C, FIG. 1, wherein:

The top unit A is an independent mechanized unit to support at least one seat 2, keeping a patient 3 and drive 16, calculated for effortless vertical movement of seat 2 supporting patient in a suspended position and connected to the top unit A by removable links 4.

The bottom unit B, is a base 5 to support top unit A via connecting elements C. The base 5 is adapted for removable connection wheels 10 of different diameters, enabling PTTC assembly operation under the low bed-floor clearance for indoor-outdoor transportation, and moving seat 1 from the bed to different destinations.

PTTC-1 is a mobile model designed for transfer patients from a bed to indoor-outdoor transportation by a single caregiver.

PTTC, FIG. 1 assembles top unit A and bottom unit B, wherein removable wheels 10, enabling PTTC movement of bedridden patients from the bed to indoor-outdoor areas with available service at any time of repositioning.

Figure 2:
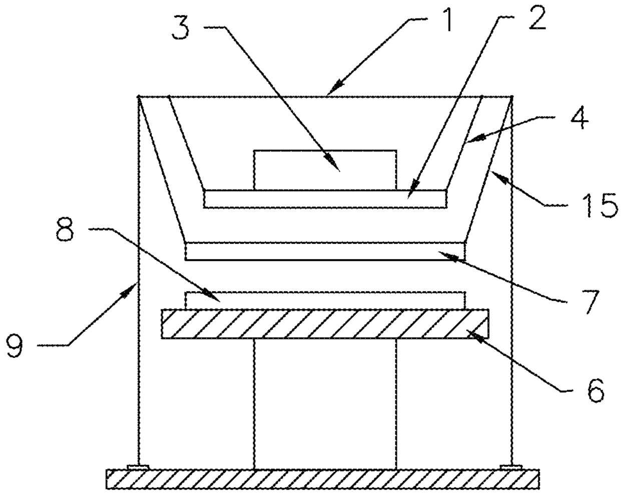
FIG. 2 is an illustration of an embodiment of a PTTC in accordance with the invention with a stationary base.
Figure 3:
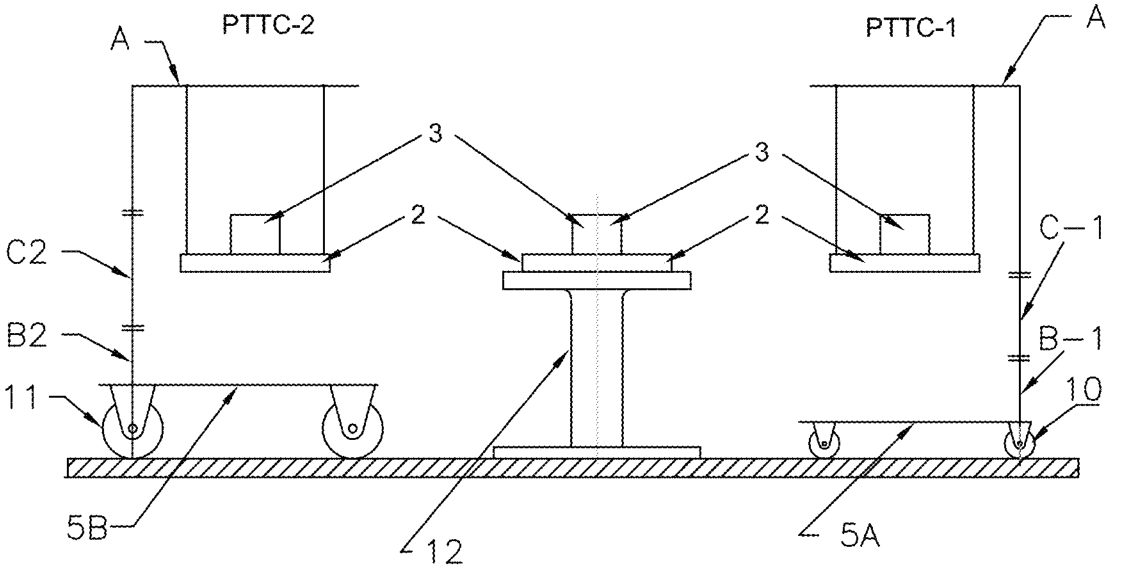
FIG. 3 illustrates the manner in which PTTCs assemblies can be used to transfer between mobile bases through a stationary base.

FIGS. 1, 2, and 3 demonstrate the creation of some PTTC models by connecting the top unit A to different mobility bottom units by length adjustable spacers as removable connecting elements, wherein the spacers 9 support the top unit A over the bed, forming a stationary operating system PTTC-4, FIG. 2. In FIG. 3, spacer C-1 is a spacer to connect bottom unit B-1 with the top unit A in model PTTC-1 for indoor-outdoor operation, and wherein the spacers C-2 connect bottom unit B2 with the top unit A at a newly formed model PTTC-2 for outside rides. Wheels 10 are connected to the bottom unit B-1 base 5A, for indoor-outdoor operation PTTC-1 model, whereas wheels 11 are part of the bottom unit B2 base 5B for outside rides.

The length of the C-2 spacer is calculated to keep unit A at the same operational heights for models PTTC-1 and PTTC-2.

Figure 6:
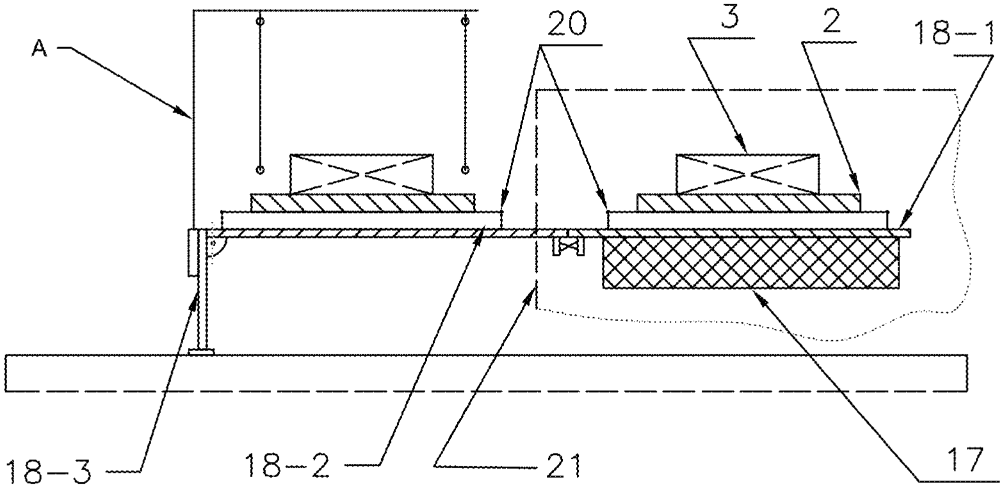
FIG. 6 illustrates another configuration of the PTTC to move patients in and out of an automobile (car) cabin.

The PTTC is adapted for conjunctions with various extensions for an outside ride and services (see FIGS. 3 and 6).

PTTC-2, FIG. 3, is a system for moving patients from the bed to outside transportation by a single caregiver.

The system consists of PTTC-1, FIG. 1, the bottom unit 5B as a base for outdoor rides, adapted for removable connection the top unit A removed from PTTC-1 base 5A. A table 12 is used as the intermediate support for the seat 2 enabling connection module A to the base 5B, to create an assembly for outside transfer patients.

PTTC-3, FIG. 6 is a system to transfer patients from the bed to the car's driver or passenger seat, procedure chamber, or horizontal repositioning seat.

The system consists of PTTC-1 and a shuttle system as a horizontally positioned frame to support and guide the shuttle as a slide to move the seat 2 along the frame.

The shuttle frame is designed as an assembly of removable connected first frame 18-1 and second frame 18-2, wherein the first frame 18-1 rests on car seat 17, the seat 2, is positioned outside cabin 21 and can be supported by a height-adjustable post 18-3.

The second frame 18-2 is adapted for a removable connection unit A removed from PTTC-1.

In operation, PTTC-1 moves seat 2 from the bed to shuttle 20 to be moved by shuttle 20 inside the cabin 21.

The disconnected second frame 18-2 and PTTC-1 are placed on the car for transportation.

The multi-service for patient 3 can be provided by PTTC-1 or module A removed from PTTC-1 and connected to the second frame 18-2, FIG. 6. The service to the patient is available at any time of the ride.

PTTC stationary models PTTC-4, FIG. 2, support the top unit A over the mattress 6, where the service seat 7 is supported by the mattress 6, by a height-adjustable frame 8, or in suspended position by removable links 15.

The PTTC assemblies of the top and bottom units are adapted for removable connection service seats 7 to deliver SPH services directly to the patient in a suspended position, wherein the drive 16 lifts the seat 2 supporting patient 3 to generate space for the connection service seat 7 and lowers seat 2 to rest the patient 3 on the service seat 7 for multi-safe patient handling operations.

Figure 4:
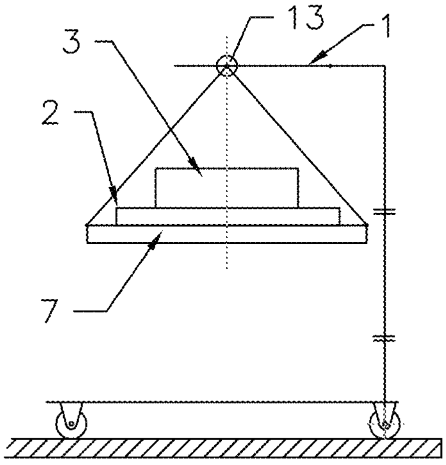
FIG. 4 illustrates another configuration of the PTTC with a mobile base.
Figure 5:
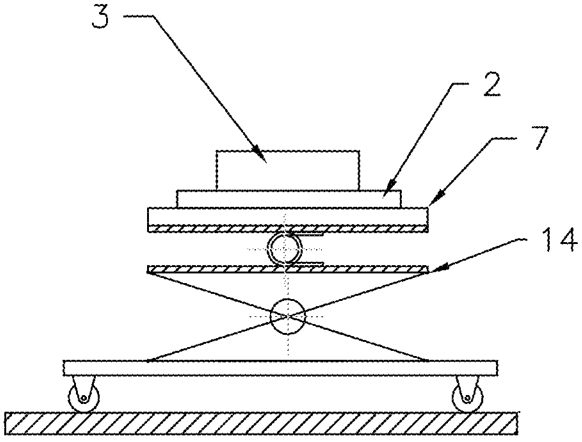
FIG. 5 illustrates another configuration of the PTTC with a mobile base.

Service seat 7 is adapted for a pivotal connection 13 at suspended position as shown in FIG. 4 or the height-fixed position 14 as shown in FIG. 5.

Service seat 7 in the suspended position is connected to the top frame 1 by removable links 15, FIG. 2, and the height-fixed service seat is supported by a height-adjustable frame 8, attached to the bottom base, FIG. 1.

Service seat 7 at a height-fixed position can be connected to the seat 2 frame.

The service seat 7 at the height-fixed position shown in FIG. 1 can be used as an intermediate table in the PTTC-2 settings.

The PTTC adapted to use single or combinations sources of vertical movements seat 2 supporting patients 3, as shown in FIG. 1.

The top unit A, with attached drive, makes any PTTC models an independent, self-contain system enabling a single caregiver transfer patient from the bed to any destination, service to the patient, change PTTC configuration and create various centers for services patients.

The PTTC mechanized module A enables single caregiver change PTTC configuration and services at any time of the operation.

In PTTC mechanized service of engagements seats supporting patient, the patient on the seat considered as sensitive passive load not removable or contacted by a caregiver.

The transfer patient from his supine position to and from PTTC seat are only manual operations in serving bedridden patient by PTTC operating by a single caregiver.

At least one of the inventions disclosed herein is not limited to the above embodiments and should be determined by the following claims. There are numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A mechanized two-seat patient service system for transporting and servicing bedridden and low-mobility patients, the system comprising:

a top unit as an assembly comprising a frame;

a drive;

a first seat configured to support the bedridden or low-mobility patient and removably connected to the drive; and a second replaceable service seat configured to support the first seat and removably connected to the frame of the top unit;

the top unit being removably connected to the first seat and the second seat and configured to removably connect to a plurality of different stationary or mobile bases via removable connecting elements to generate a plurality of service assemblies;

wherein the first seat is configured to support the patient in all mechanized operations, is configured for removable connection to links of the drive and is vertically movable by activating the drive, wherein the first seat is configured to be lifted to disconnect from the second seat and lowered to rest the first seat onto the second seat, the plurality of bases having different configurations and each of which is configured to be removably connected to the top unit at a different time by connecting elements, the system having a plurality of service assembly configurations in each of which the top unit is connected to a respective one of the bases, at least a first one of the bases being mobile for indoor transportation, a second one of the bases being mobile and for outdoor transportation, and a third one of the bases being stationary;

whereby each service assembly configuration of the top unit when connected to the first mobile base is for indoor services, when connected to the second mobile base is for outdoor services, and the stationary base enables a single caregiver to move the bedridden or low-mobility patient between indoors and outdoors via transfer when the top unit is connected to the stationary base.

2. The system of claim 1, wherein the first seat is configured to support the patient in a suspended position or rest on various support surfaces, and be removable.

3. The system of claim 1, wherein the connecting elements removably connect the top unit to each of the first, second and third bases when each of the first, second and third bases is connected to the top unit such that the top unit is removable from connection to each of the first, second and third bases, an upper end region of each of the connecting elements being attached to the top unit and a lower end region of each of the connecting elements being attached to the first, second or third base such that the top unit is distance from the first, second or third base in each service assembly configuration by the connecting elements.

4. The system of claim 3, further comprising supports on which the first seat is positioned, wherein the supports are mobile stationary supports.

5. The system of claim 1, further comprising links that support the second seat in a suspended position, the links being removably connected to the top unit at a height-fixed position by a height-adjustable frame, the second seat being removably coupled to the base.

6. The system of claim 5, wherein the second seat is also configured for a pivoting connection in a suspended or height-fixed position to the top unit or the base accordingly.

7. The system of claim 1, further comprising an intermediate table to support the first seat when disconnected from the top unit.

8. The system of claim 1, wherein the system to transfer patients from the bed to outside services includes a shuttle as a horizontal slide on a guiding frame to move the first seat for outside service.

9. The system of claim 1, wherein the third one of the bases is a stationary support frame that supports the top unit.

10. The system of claim 1, wherein the top unit and mobile bases comprise interchangeable parts.

11. The system of claim 1, wherein the drive is removably connected to the frame of the top unit.

12. The system of claim 1, wherein the drive comprises a drive element on each side of the frame of the top unit.

13. The system of claim 1, wherein the drive is arranged above the first seat, the first seat being suspended from the frame of the top unit.

14. The system of claim 1, wherein the first seat is suspended by links from the frame of the top unit.

15. The system of claim 1, further comprising links that removably connect opposite lateral sides of the first seat to the frame to enable the first seat to be connected to the frame or be separate from the frame while leaving a front side of the seat open to enable the bedridden or low-mobility patient to sit on the first seat and be removed from the first seat.

16. The system of claim 1, wherein wheels of the first base have a first diameter and the wheels of the second base have a second diameter larger than the first diameter.

17. The system of claim 1, wherein the drive is on the frame and controlled to cause the first seat to move vertically relative to the frame to operatively lift and lower the bedridden or low-mobility patient, the drive being controlled to lift the first seat from a position on the third base to a position above a height of the third base when the top unit is connected to the first base or the second base to enable the first seat to be moved between the second base and the first and third bases.

* * * * *